(12) United States Patent
Raghavareddy (10) Patent No.: US 9,081,694 B2
(45) Date of Patent: Jul. 14, 2015

(54) SYSTEMS AND METHODS FOR ASYMMETRIC MULTIPROCESSING

(75) Inventor: Sivaprasad Raghavareddy, San Jose, CA (US)

(73) Assignee: BIVIO NETWORKS, INC., Pleasanton, CA (US)

( * ) Notice: Subject to any disclaimer, the term of this patent is extended or adjusted under 35 U.S.C. 154(b) by 1615 days.

(21) Appl. No.: 12/353,908

(22) Filed: Jan. 14, 2009

(65) Prior Publication Data

US 2009/0182980 A1    Jul. 16, 2009

Related U.S. Application Data

(60) Provisional application No. 61/020,968, filed on Jan. 14, 2008.

(51) Int. Cl.
*G06F 12/10* (2006.01)
*G06F 9/32* (2006.01)
*G06F 9/38* (2006.01)
*G06F 9/50* (2006.01)

(52) U.S. Cl.
CPC ............... *G06F 12/10* (2013.01); *G06F 9/321* (2013.01); *G06F 9/3885* (2013.01); *G06F 9/5016* (2013.01)

(58) Field of Classification Search
None
See application file for complete search history.

(56) References Cited

U.S. PATENT DOCUMENTS

| 5,247,685 | A  | * | 9/1993 | Landry et al. ............... 710/269 |
| 6,247,109 | B1 | * | 6/2001 | Kleinsorge et al. ............ 712/13 |
| 6,314,501 | B1 | * | 11/2001 | Gulick et al. ................ 711/153 |
| 6,647,508 | B2 |   | 11/2003 | Zalewski et al. |
| 6,813,522 | B1 |   | 11/2004 | Schwarm et al. |
| 2002/0016892 | A1 | * | 2/2002 | Zalewski et al. ............. 711/153 |
| 2007/0074011 | A1 |   | 3/2007 | Borkar et al. |
| 2007/0079107 | A1 |   | 4/2007 | Van Den Berg et al. |

OTHER PUBLICATIONS

Search Report issued in corresponding PCT application No. PCT/US2009/31001 on Mar. 13, 2009.

* cited by examiner

*Primary Examiner* — Corey S Faherty
(74) *Attorney, Agent, or Firm* — Pillsbury Winthrop Shaw Pittman LLP (57) ABSTRACT

Systems and methods are described for managing applications in a computer system. An operating system kernel such as Linux can be started and executed at different addresses other than the address typically used for such kernels. An operating system kernel can accommodate end of memory and size of memory that do not comply with normal system specifications. Mechanisms are described that change methods for exception vector handling using a software fix. Dual and/or multi-core systems can run applications in both SMP and ASMP modes without needing any hardware changes. Separate instances or similar copies of an OS such as Linux can be executed on multiple cores in ASMP mode. In SMP mode, Linux or another OS can run as a single instance of the OS.

20 Claims, 7 Drawing Sheets

SYSTEMS AND METHODS FOR ASYMMETRIC MULTIPROCESSING

CROSS-REFERENCE TO RELATED APPLICATIONS

The present application claims priority from U.S. Provisional Patent Application No. 61/020,968, entitled "Method and System for Asymrmetric Multiprocessing," which was filed on Jan. 14, 2008 and is incorporated by reference herein in its entirety.

BACKGROUND OF THE INVENTION

1. Field of the Invention

The present invention relates generally to computer operating systems, and more particularly to computer systems having multiple processors and operating systems supporting symmetric and asymmetric multiprocessing.

2. Description of Related Art

Many proprietary computer systems, including those comprising network elements such as servers, gateways, firewalls, etc., ship with processors and open operating systems for running applications on the processors such as the Linux operating system. Purchasers and users of such systems can then extend the functionality of such systems by writing and/or loading applications to run on the processor under the operating system.

Typically, the Linux kernel executes starting from the lowest memory address 0x00000000 on a PowerPC architecture. As more and more memory is needed for applications, it uses all the memory up to the physical end of memory to run both the Linux kernel and the user applications. Currently most operating systems, including the Linux kernel, do not support starting from a different address, say 0x40000000 (1 GB). However, it may be desirable in some circumstances to do so, for example to reserve the low address for some other purpose, or to provide some other external entity or processor with exclusive access to the low address.

Additionally, some types of processors include two or more processor cores. In a typical dual-core PowerPC system (e.g. Freescale's 8641 D's architecture), for example, Symmetric Multi Processing ("SMP") Linux can be run to support two cores and to take advantage of the cores. This can enable faster processing of user applications, as well as allowing a higher number of applications to run than would otherwise be possible.

In an SMP architecture, both cores are managed by the SMP Linux kernel that decides which process gets to run on which processor core. Sometimes it may not be possible to fully take advantage of the dual cores due to the nature of the application. Consequently, the alternative Asymmetric Multi Processing (ASMP) was developed, where both cores act as two individual processors, without any relation with each other. Each core runs its own operating system and user applications. This allows users to use two entirely separate processors, even though they are actually included in one dual core system. Any process that needs to communicate with a process running on the other core needs to go through some external mechanisms such as shared memory or sockets.

The FreeScale PowerPC architecture considers the low addresses for all standard exceptions. In order to support exceptions separately for each processor and to run a separate operating system, some processor suppliers developed a mechanism called "Low Memory Offset Mode." (See section 1.3.6 of "MPC8641 D Integrated Host Processor Family Reference Manual"). If a computer system supplier provides a system that supports using ASMP on an 8641D PowerPC processor, a hardware change is needed to enable the "low memory offset mode." However, if users prefer running SMP mode, a hardware change is needed to remove "low memory offset mode."

Accordingly, when system suppliers build a system using processors such as the 8641D, a hardware change is needed to configure the system to run Linux in either ASMP or SMP mode before the system is shipped. This may not provide enough flexibility for users, who may want to run the same system under either mode depending on their application requirements. However, if a supplier wants to support both SMP and ASMP after shipping such systems, then a hardware change will be needed on the field, making support of both modes expensive and difficult.

BRIEF SUMMARY OF THE INVENTION

Certain embodiments of the present invention comprise systems and methods for managing applications in a computer system. According to one aspect, the invention enables an operating system kernel such as Linux to start and run at a different address than at the regular 0x00000000 address. In some of these embodiments, the present invention allows an operating system kernel to accommodate end of memory and size of memory differently. In some embodiments, the invention provides a mechanism to accommodate the exception vectors for multi-core systems in hardware using a software fix. According to another aspect, the invention enables a dual or multi-core system to run applications in both SMP and ASMP modes without a hardware change. In certain embodiments, the invention uses the above and other solutions to run two separate similar copies of Linux on both the cores for ASMP mode, with the kernel for core 0 running from 0x00000000 and the kernel for core 1 running from a higher address (e.g. 0x40000000). If the user chooses to run SMP Linux, it will run from 0x00000000 as a single copy.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for managing memory in multi-processor computer systems that allow the systems to dynamically change operation modes between Symmetric Multi Processing ("SMP") and Asymmetric Multi Processing ("ASMP") systems modes. Systems provided according to certain aspects of the invention accommodate and control access to memory when multiple processors operate cooperatively on a common system bus, using shared memory. In particular, SMP and ASMP modes can benefit from derivative advantages that include ability to maintain multiple instances of an operating system and/or applications, improved memory efficiency, reduced loading of system resources and so on.

Figure 1:
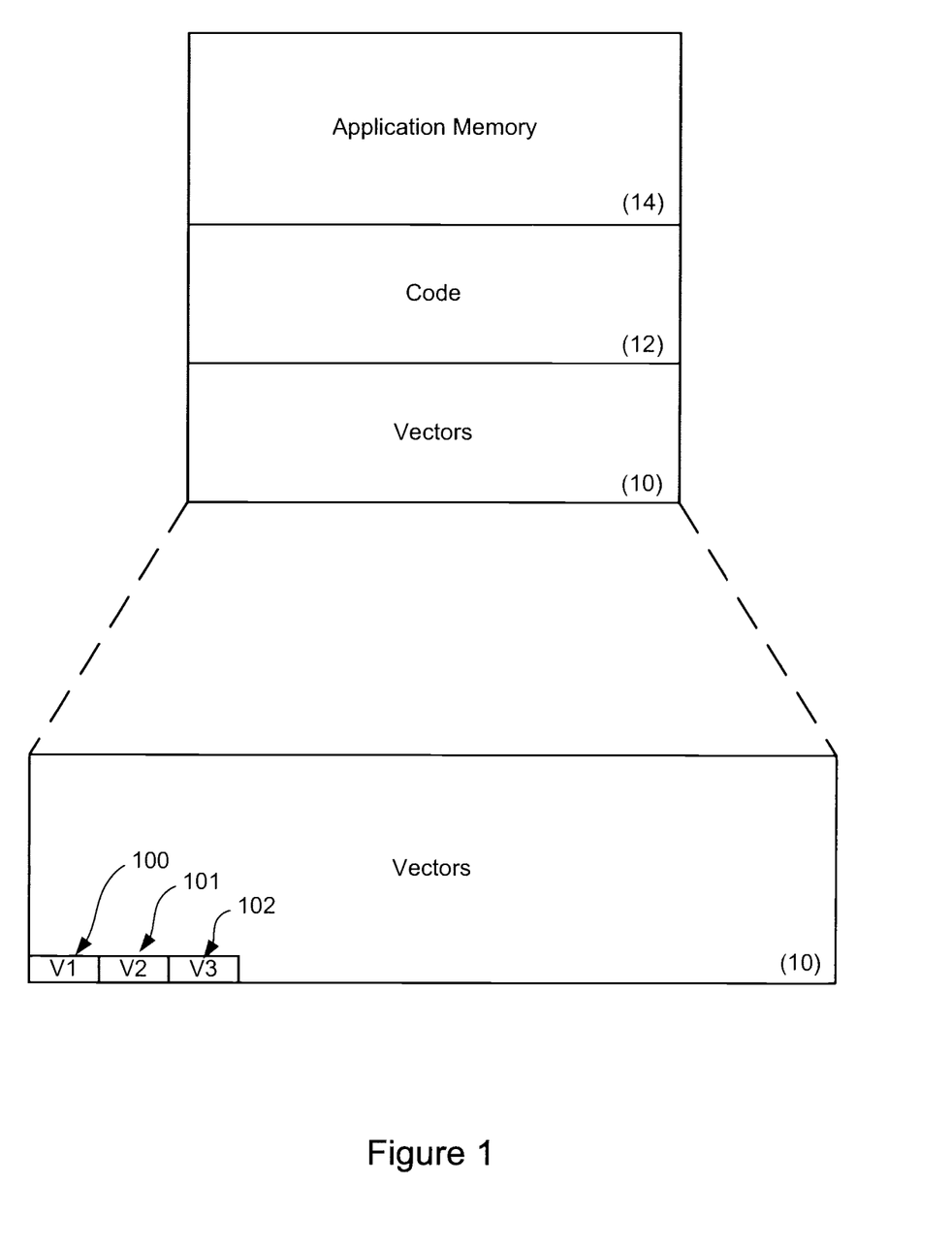
FIG. 1 is a simplified memory map depicting relative storage locations in systems used to illustrate certain aspects of the invention.

Certain embodiments of the invention enable remapping of system memory to accommodate predefined and fixed memory usage in computer systems. FIG. 1 shows a generalized memory map associated with a processing system in which certain areas are reserved for specific uses. Reservation of memory areas can be required by both hardware and software components of the processing system. For example, a first area of memory 10 may be reserved for vectors 100, 101 and 102, including exceptions, reset vectors, interrupt vectors, software traps, etc. Vectors 100, 101 and 102 identify a starting point in program memory of software provided to handle a reset or interrupt. In another example, certain areas of memory may be reserved for instructions to be executed upon the occurrence of certain events such as assertion of an interrupt or a reset. The instructions may include a jump instruction to a program or handler of the reset event or interrupt. Moreover, certain operating systems designate an immovable starting address.

In SMP systems, a single operating system can manage fixed memory areas, interrupt handling and memory allocation through a single common set of services. However, ASMP systems operating independent versions of an operating system can require hardware modification or reconfiguration to enable coherent management of fixed memory areas common to more than one processor.

Figure 2:
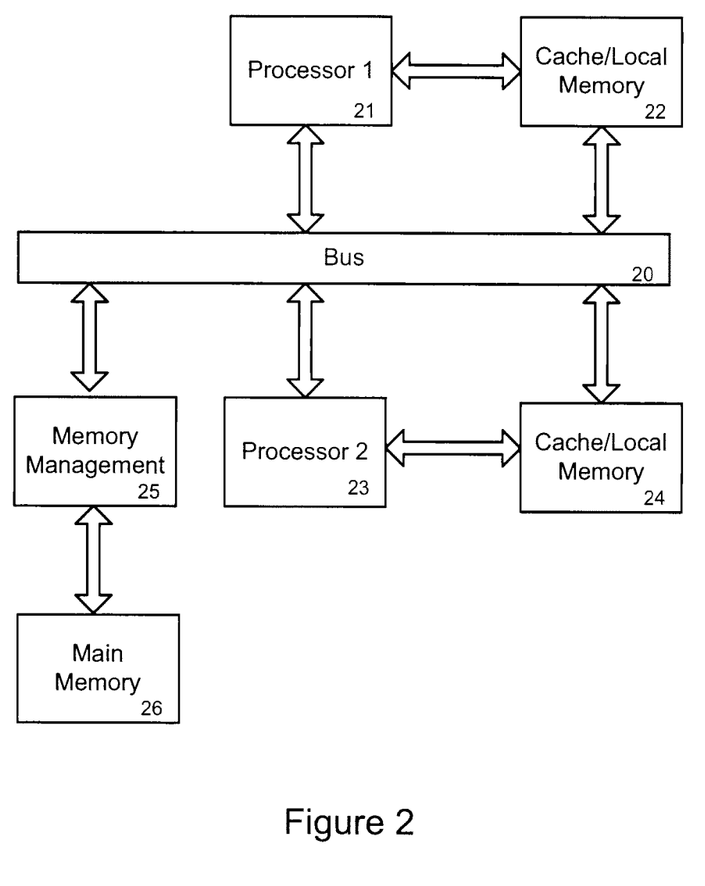
FIG. 2 is a simplified block schematic of a multiprocessor system.

FIG. 2 depicts a general case of a multiprocessor system that includes two or more processors 21 and 23 connected using a common bus 23 to a memory 26, often using a memory management unit 25. Each processor 21 and 23 may optionally be connected to a separate, often dedicated memory 22 and 24 that may serve as local application memory, local program storage, cache or other purpose. Dedicated memory 22 or 24 may be accessible using bus 20, typically using a memory controller/manager (not shown). Each of processors 21 and 23 may be controlled by an instance of the same operating system (ASMP) and may execute any application dispatched by a scheduler that balances and monitors the processors 21 and 23. Applications and/or portions of applications executed on either processor 21 or 23 can cause processor 21 or 23 to allocate memory from main memory.

Figure 3:
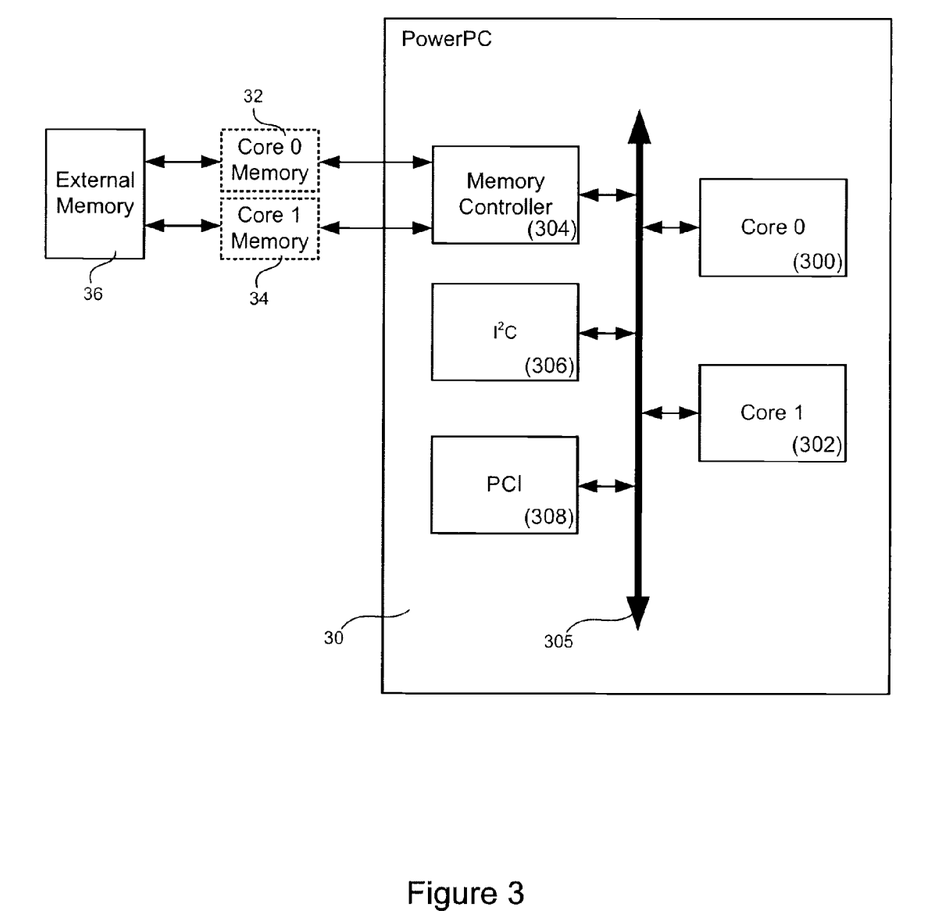
FIG. 3 is a simplified block schematic of a multicore processor.

FIG. 3 depicts a more specific example of a multiprocessor system. A PowerPC device 30 comprises two core processors 300 and 302 connected using a common bus 305. Interface devices, including peripheral control interface controller 308 and inter-integrated circuit controller 306 are connected to bus 305 and available to cores 300 and 302. Memory controller 304 provides multi-channel access 32 and 34 to external memory 36. As depicted in the example, certain embodiments of the invention improve performance by allocating separate memory channels 32 and 34 to each of cores 300 and 302, respectively, in order to provide independent access to memory 36 with less bus contention. The example of FIG. 3 will be used throughout this description in illustrating certain aspects of the invention.

Figure 4:
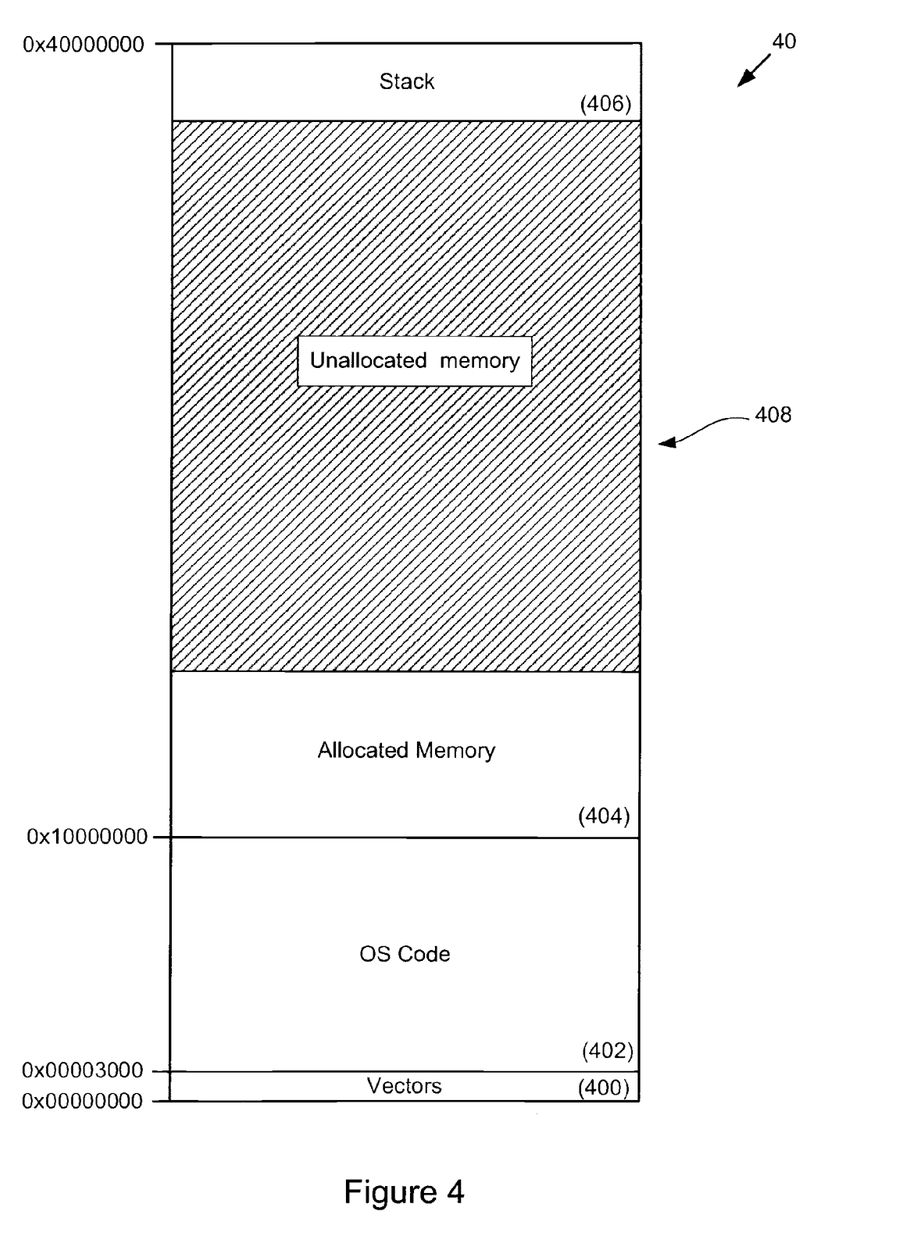
FIG. 4 is a simplified map illustrating memory usage.

FIG. 4 shows a stylized memory map that serves as a general model for each processor core 300 and 302 when executing an operating system. The memory map is provided to assist in the description of certain aspects of the invention and represents the memory map known to or perceived by a single core 300 or 302. For the purposes of description, an area of memory defined by address range 0x00000000-0x00002FFF is reserved and holds certain immovable vectors used to identify the starting address of interrupt handlers, exceptions and boot code. When 2 GB of system memory is available, each of two cores 300 and 302 may allocated approximately 1 GB each and each processor 300 and 302 will typically be aware of only its corresponding 1 GB of memory. Note that certain areas of the memory map be virtualized; for example, cores 300 and 302 may share vectors 400 in low memory and memory for second core 302 may appear contiguous with vector space 400 although it is located at addresses above 0x4000000 of system memory. Again, for the purposes of this discussion, it will be assumed that system stack 406 is allocated backwards from the end of perceivable system memory and the stack counter when 1 GB of memory can be found would consequently be initially set to 0x4000000 for each core 300 and 302. Remaining memory will be allocated from the address 0x00003000 upward and, for the purposes of discussion, it will be assumed that the operating system 402, including vectors 400 resides within the first 256 MB and that memory 404 used for application code and data begins at address 0x10000000. Note that this description covers one embodiment of the invention and other memory maps and virtual memory schemes may be adopted.

Figure 5:
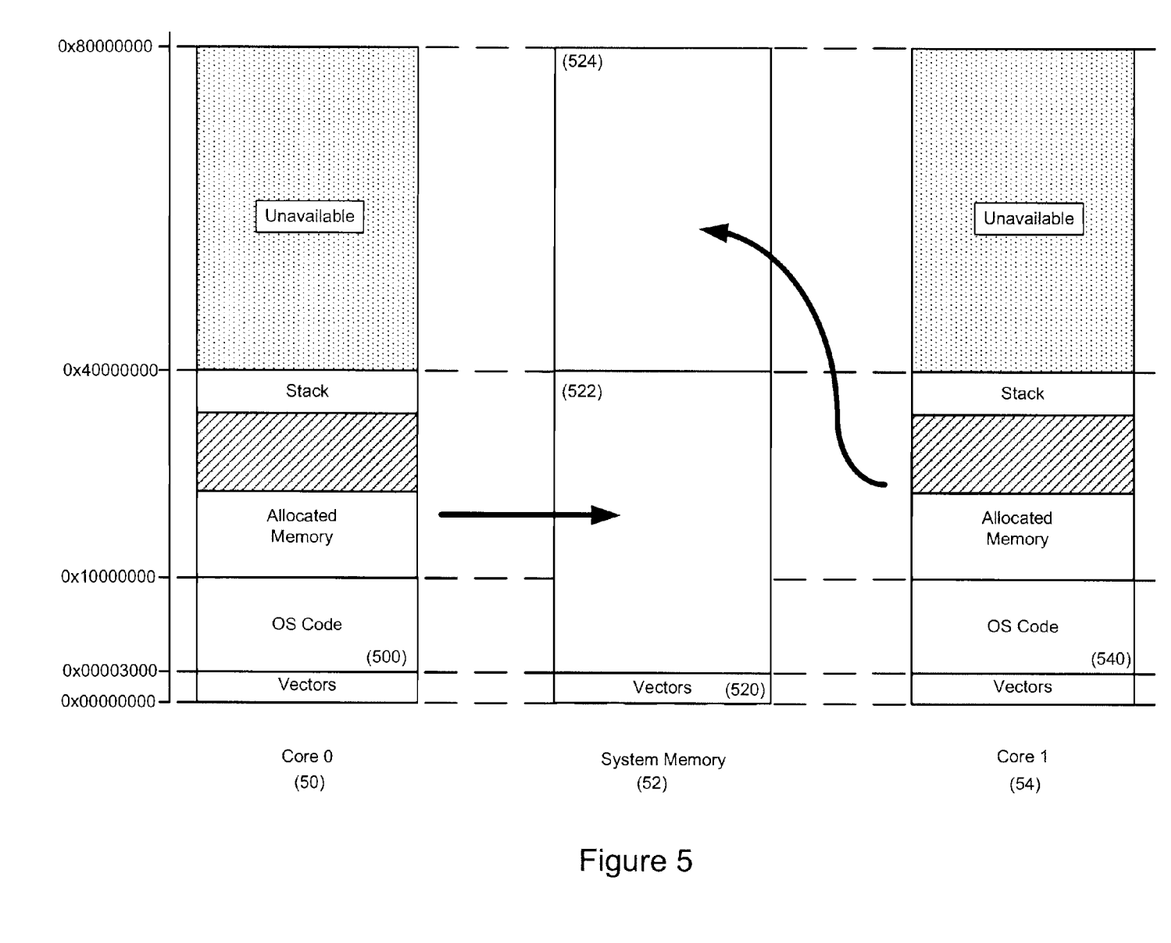
FIG. 5 depicts mapping of memory in a multiprocessor and/or multicore systems according to certain aspects of the invention.

Note that when multiple processors share the same block of system memory, stack is allocated separately for each core and is typically not shared. In the two core example, stack is allocated backwards from 0x40000000 for first core 300, and backwards from 0x80000000 for second core 302. Only the vectors are shared by both cores from core 0's location. FIG. 5 illustrates the allocation of memory in a system according to certain aspects of the invention using the PowerPC processor 30 of FIG. 3 when operated in ASMP mode. Each core processor 300 and 302 is allocated a portion of the system memory 52. For the purposes of this discussion, core processors 300 and 302 each are allocated half of system memory

52. Core processor 300 accesses memory from the first Gigabyte 522 of system memory 52 while core processor 302 accesses memory in the second Gigabyte 524 of core memory 52.

Aspects of the present invention provide systems and methods which manage memory, direct interrupts and handle system events. In one example, interrupts are initially handled using vectors and/or code stored in low memory 520, which may lie in first core processor 300 space. The interrupt or exception will typically be processed by the core processor 300 or 302 responsible for responding to the interrupt. For example, an application on core processor 302 may initiate a network transmission that draws a response to be ultimately handled by core processor 302. Accordingly, an interrupt indicating receipt of the response would be received by processed by core processor 302. Handling the response requires access to memory for in the system vector space 520. In certain embodiments, vector code in memory 520 is shared by both cores 300 and 302. For example, when there is a 'machine check exception' on core 1 302, exception code at a first core 300 memory location will be executed by second core 302 itself, which eventually moves back to its own memory area 524 by re-enabling address translation. A similar exception for first core 300, will also execute code at same location of system memory 520; however, this portion of memory 520 lies with address space 522 addressable by the first core 300.

Certain embodiments of the invention permit relocation of an operating system kernel. In one example, Linux is configured to start at address 0x00000000 on a PowerPC processor. As shown in FIG. 5, however, the ASMP multiprocessing system of FIG. 3 includes two copies of the operating system 500 and 540, of which one OS copy 500 resides in lower portion 522 of system memory 52 commencing at address and the other OS copy 540 resides in an upper portion 524 of system memory 52 commencing at address 0x40000000. Aspects of the present invention include permitting operating system kernel 540 to start at a higher address by adjusting how the kernel responds to requests by applications to allocate memory. In the example, the kernel 540 allocates memory beginning at physical address 0x40000000 and each successive allocation assigns the next higher available block of sufficient size to satisfy the request. Accordingly, in certain embodiments, kernel 540 is forced to allocate memory from the higher non-zero threshold address and further prevents successive allocations from using any memory below that threshold address. Thus, the first 1 GB of memory can be effectively reserved for core 0 running kernel 500.

It will be appreciated that many operating system kernels define the size of available memory as the end of memory, based on an assumption that memory starts at 0x0000000. However, when the starting address is changed to a higher threshold, the kernel 540 may require modification and/or configuration to accommodate differences between end of memory address and size of memory. Modifications can include altering the size calculation to subtract the start address from the end address to obtain a size. Moreover, the end of memory address is often used as the default start of system stack and appropriate configuration may be required to ensure that stack is properly located within the bounds of memory set for each instance of OS.

Certain embodiments accommodate hard-coded vectors whereby addresses of certain vectors may be fixed in memory for both core processors 300 and 302. In the PowerPC architecture example, all exceptions for both core processors 300 and 302 cause vector fetches to vector addresses 520 in low memory 522. Exception vectors cannot be changed in the PowerPC architecture except in cases where a specific hardware configuration means is provided. In some embodiments, some low memory addresses will be used by applications such as exception handlers. Therefore, memory starting at the zero address may need to be reserved for exception vectors and code shared by both cores.

In certain embodiments, hardware modification may be required to enable a low memory offset that allows relocation of vector space. However, since the use of such offset generally requires physical changes to the hardware of the system, certain embodiments of the invention provide alternatives for handling fixed addresses that permit dynamic switches of operating mode between SMP and ASMP. In ASMP mode, some conditional code may be added to the OS kernel to detect the identity of the core upon which it is running. The conditional code is typically provided with bootstrap, system loader or other initialization firmware. For the second (Core-1) processor 302, the OS kernel can be loaded in "high" memory block 524 with the "low" memory block 522 being marked as reserved. For the first (Core-0) processor 300, the OS kernel can be loaded in "low" memory block 522 with the "high" memory block 520 being marked as reserved. The conditional code for each core processor 300 and 302 may then adjust respective memory size and "end-of-memory" parameters and may install reconfigured interrupt handlers, event handlers, inter-process and inter-processor communications services that accommodate the ASMP configuration of the processors 300 and 302.

In certain embodiments, memory controller 304 may be configured to provide multi-channel access 32, 34 to system memory 36. Multi-channel access 32, 34 can be leveraged to improve system performance by directing memory requests to channels assigned to the core processor 300 or 302 on which applications or OS service requesting memory is hosted. Thus, different areas of system memory 36 reserved for each core 300 or 302 can be accessed through memory controller channels reserved for the corresponding core 300 or 302. For example, one channel 32 can be configured to access the area of system memory 36 reserved for a first core 300, while another channel 34 can be configured to access the area of system memory 36 reserved for the second core processor 302. Accordingly, it is less likely that applications on either core will not use the same channel, and performance can be improved.

Figure 6:
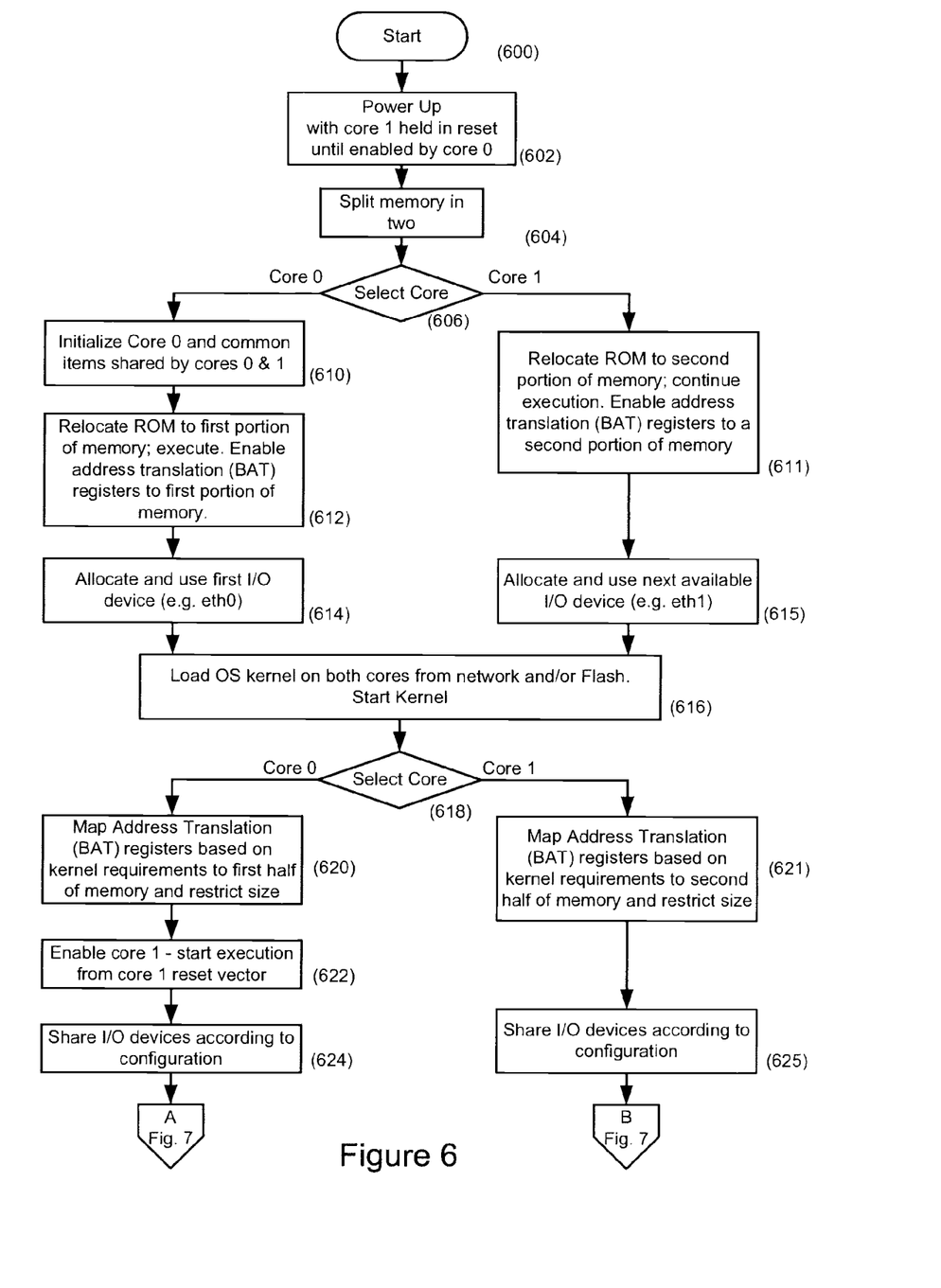
FIG. 6 is a flowchart depicting system initiation and startup in multiprocessor and/or multicore systems according to certain aspects of the invention.
Figure 7:
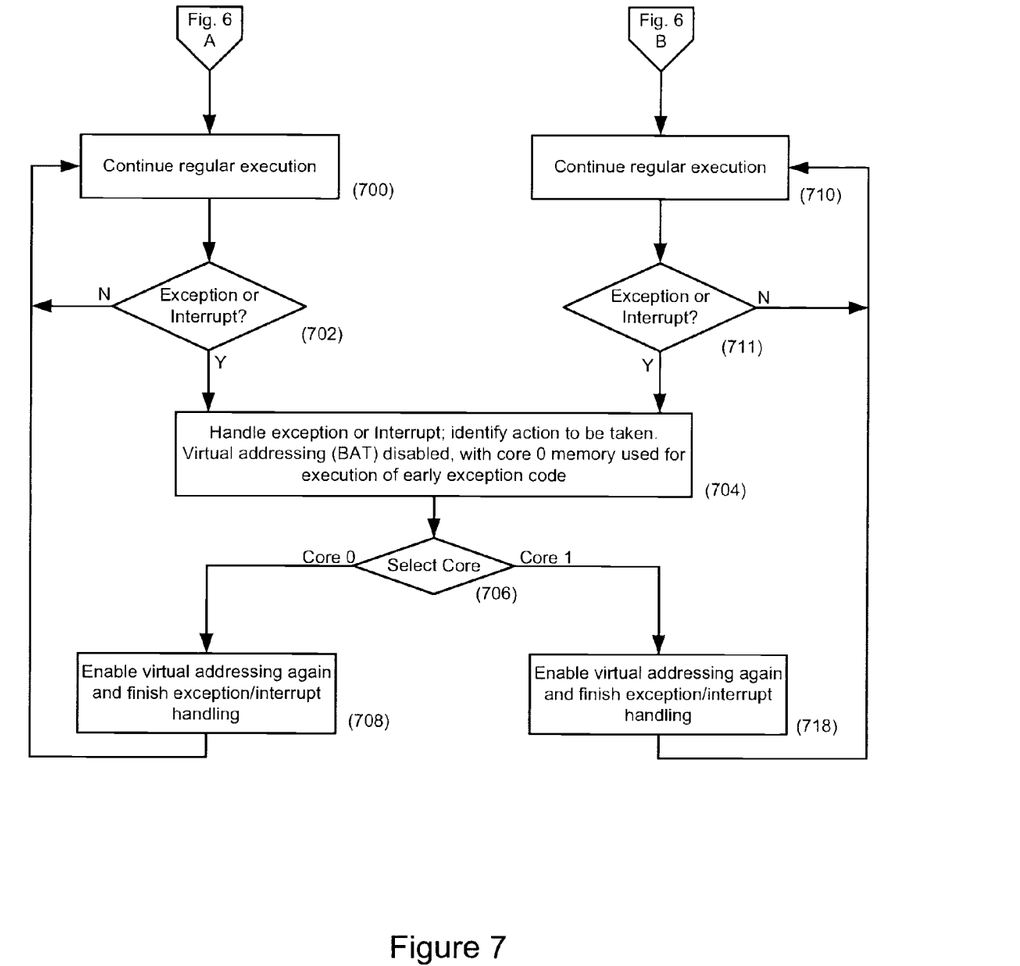
FIG. 7 is a flowchart continuing from FIG. 6 and depicting system operation and exception handling according to certain aspects of the invention.

Referring also now to FIGS. 6 and 7, the operation of a system according to certain aspects of the invention will be described. At startup 600 of the system, certain initial operations are performed to prepare processor 30 prior to configuration and execution of the operating system or systems. In certain embodiments, these initial operations typically include executing at step 602 power up and initialization code specific to first core (core 0) 300. Next, at step 604, memory may be split into portions allocated to each core 300 and 302. Splitting can include initializing, programming and enabling memory controller 304. Typically, core 1 is maintained in reset state while the system is configured.

The power-up sequence for cores 300 and 302 diverge at step 606. For core 0, initialization code may be executed at step 610 that configures and initializes system components and memory areas, including stack pointers, communication devices, device speed, interrupt vectors and so on. Some of these components may be shared with core 1 302 when operational. At step 612, memory is allocated for the OS kernel and memory management registers: for example, block address translation ("BAT") registers may be configured. This step may also include relocating ROM to lower system memory 522, using an adapted boot loader or other mechanism. At step

614, a standard I/O channel may be configured for use by first core 300. For example, an Ethernet or other network device may be allocated to first core 300.

For core 1 302, when enabled, the core 302 may execute a limited and/or adapted power-on reset sequence that includes relocating system ROM to upper system memory 524 at step 611. BAT and other registers may be configured according to the memory map provided for core 1 302. At step 615, a standard I/O channel may be configured for use by second core 302. For example, an Ethernet or other network device may be allocated to second core 302.

At step 616, the OS kernel may be loaded for cores 300 and 302 using network connections or Flash memory devices, as appropriate. Operations may diverge again at step 618. For first core 300, BAT registers are mapped to first half of memory 522 at step 620. Second core 302 may then be released and/or enabled at step 622 for normal operation by, for example, enabling interrupts and exceptions and/or by causing the processor to jump to the start of the OS kernel, start of a board support package or other initializing code. At step 624, I/O devices may be shared as determined by system and/or application configuration. Second core 302 may map BAT registers to second half of memory 524 at step 621. At step 625, I/O devices may be shared as determined by system and/or application configuration.

FIG. 7 depicts a simplified flowchart for normal operation of the system. First core 300 performs normal operations at step 700 but may be interrupted by an exception, interrupt, trap, etc. At step 702, an interrupt or exception may be detected that requires system level processing at step 704. For second core 302, application processing 710 may be interrupted at step 711 by an exception or hard wired interrupt, etc., requiring processing at step 704. Processing at step 704 may require disabling virtual addressing until processing of the exception is complete when both cores 300 and 302 can access system memory vector space. At step 706, the exception/interrupt handler determines which core 300 or 302 should complete the processing of the exception/interrupt and transfers control to step 708 or 718 accordingly. These latter steps typically re-enable virtual addressing before completing exception handling.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for asymmetric multiprocessing. Some of these embodiments comprise reserving a first block of memory to a first processor and a second block of memory to a second processor. Some of these embodiments comprise installing a first instance of an operating system in the first block of memory and a second instance of the operating system in the second block of memory. Some of these embodiments comprise causing the second processor to execute the second instance of the operating system. In some of these embodiments, the first block of memory includes at least one fixed vector used by the second processor. In some of these embodiments, the second processor executes instructions commencing at an address identified by the fixed vector and exception vector code shared by both first and second processors in response to an interrupt directed to the second processor.

In some of these embodiments, the first and second processors are core processors collocated on a semiconductor device. In some of these embodiments, the first block of memory includes a first stack allocated to the first processor and the second block of memory includes a second stack allocated to the second processor. In some of these embodiments, the first instance of the operating system services memory allocation requests from the first block of memory. In some of these embodiments, the second instance of the operating system services memory allocation requests from the second block of memory. In some of these embodiments, the second instance of the operating system accesses memory through a different address translation than the first translation. In some of these embodiments, the address translation is disabled during exception and/or interrupt processing by the second instance of the operating system. In certain embodiments, exception handlers of the first instance are shared by both instances of the operating system. In some of these embodiments, the address translation is disabled during interrupt processing by the second instance of the operating system.

In some of these embodiments, a step of fetching and/or installing the second instance of the operating system in the second block of memory is performed by the first processor. In some of these embodiments, a step of fetching and/or installing the second instance of the operating system in the second block of memory is performed from the same source as the first instance. In some of these embodiments, the second processor is caused to execute the second instance of the operating system by the first processor. In some of these embodiments, the second processor is caused to execute by removing a reset condition. In some of these embodiments, all system vectors are located in the first block of memory. In some of these embodiments, the second processor can access only the second block of memory and the system vectors. In some of these embodiments, the system vectors include immovable vectors. In some of these embodiments, exception handlers are located in the first block of memory.

Some embodiments provide an asymmetric multiprocessing system, comprising first and second processors sharing a system memory. In some of these embodiments, a first block of the system memory is reserved for the first processor and a second block of the system memory is reserved for the second processor. In some of these embodiments, system memory includes a vector space located within the first block of memory and accessible by the second processor. In some of these embodiments, the first and second blocks of memory maintain separate instances of an operating system. In some of these embodiments, the second processor accesses memory through address translation that can be different from first instance and keep the same virtual address on both processors. In some of these embodiments, the first and second processors are core processors collocated on a semiconductor device. In some of these embodiments, each of the instances of the operating system allocates memory exclusively from the block of memory in which it is maintained. In some of these embodiments, a separate stack is provided for each instance of the operating system, the separate stack residing in the block of memory in which the each instance is maintained.

Some of these embodiments comprise computer-readable media that store instructions executable by one or more processing devices. In some of these embodiments, the instructions perform the methods described above. In some of these embodiments, the method is related to asymmetric multiprocessing. Some of these embodiments comprise reserving a first block of memory to a first processor and a second block of memory to a second processor. In some of these embodiments, the first block of memory includes at least one fixed vector used by the second processor. Some of these embodiments comprise installing a first instance of an operating system in the first block of memory and a second instance of the operating system in the second block of memory. Some of these embodiments comprise causing the second processor to execute the second instance of the operating system. In some of these embodiments, the second processor executes instructions commencing at an address identified by the fixed vector and exception vector code shared by both first and second processors in response to an interrupt directed to the second processor. In some of these embodiments, the method further comprises translating addresses provided by the second processor. In some of these embodiments, the translated addresses are used to access the second memory block. In some of these embodiments, the step of installing the second instance of the operating system is performed by the first processor.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for asymmetric multiprocessing comprising:
   reserving a first block of memory to a first processor and a second block of memory to a second processor, wherein the first block of memory includes at least one fixed vector used by the second processor;
   installing a first instance of an operating system in the first block of memory and a second instance of the operating system in the second block of memory; and
   causing the second processor to execute the second instance of the operating system, wherein the second processor executes instructions commencing at an address identified by the fixed vector and exception vector code shared by both first and second processors in response to an interrupt directed to the second processor.

2. The method of claim 1, wherein the first and second processors are core processors collocated on a semiconductor device.

3. The method of claim 1, wherein the first block of memory includes a first stack allocated to the first processor and the second block of memory includes a second stack allocated to the second processor.

4. The method of claim 3, wherein the first instance of the operating system services memory allocation requests from the first block of memory and wherein the second instance of the operating system services memory allocation requests from the second block of memory.

5. The method of claim 4, wherein the second instance of the operating system accesses memory through address translation.

6. The method of claim 5, wherein the address translation is different from address translation used for memory accesses by the first instance of the operating system.

7. The method of claim 1, wherein the step of installing the first and second instance of the operating system includes using a common source for both instances.

8. The method of claim 1, wherein the first and second instance of the operating system are copied from a single source.

9. The method of claim 1, wherein the second processor is caused to execute the second instance of the operating system by the first processor.

10. The method of claim 1, wherein all system vectors are located in the first block of memory.

11. The method of claim 10, wherein the second processor can access only the second block of memory and the system vectors.

12. The method of claim 11, wherein the system vectors include immovable vectors.

13. The method of claim 1, wherein exception handlers are located in the first block of memory.

14. A non-transitory computer-readable storage medium that stores instructions executable by one or more processing devices, wherein the instructions perform a method of asymmetric multiprocessing, comprising:
    reserving a first block of memory to a first processor and a second block of memory to a second processor, wherein the first block of memory includes at least one fixed vector used by the second processor;
    installing a first instance of an operating system in the first block of memory and a second instance of the operating system in the second block of memory; and
    causing the second processor to execute the second instance of the operating system, wherein the second processor executes instructions commencing at an address identified by the fixed vector and exception vector code shared by both first and second processors in response to an interrupt directed to the second processor.

15. The computer-readable medium of claim 14, wherein the method further comprises translating addresses provided by the second processor, wherein the translated addresses are used to access the second memory block.

16. The computer-readable medium of claim 14, wherein the step of installing the first and second instance of the operating system includes using a common source for both instances.

17. An asymmetric multiprocessing system, comprising first and second processors sharing a system memory, wherein:
    a first block of the system memory is reserved for the first processor and a second block of the system memory is reserved for the second processor;
    the system memory includes a vector space located within the first block of memory and accessible by the second processor;
    the first and second blocks of memory maintain separate instances of an operating system; and
    the second processor accesses memory through address translation.

18. The system of claim 17, wherein the first and second processors are core processors collocated on a semiconductor device.

19. The method of claim 17, wherein each of the instances of the operating system allocates memory exclusively from the block of memory in which it is maintained.

20. The method of claim 17, wherein a separate stack is provided for each instance of the operating system, the separate stack residing in the block of memory in which the each instance is maintained.

* * * * *